US007114233B1

(12) United States Patent
Wyrick et al.

(10) Patent No.: US 7,114,233 B1
(45) Date of Patent: Oct. 3, 2006

(54) ENGINE COVER PULLER

(75) Inventors: Barry Lynn Wyrick, Whitsett, NC (US); Billy Wayne Overman, Burlington, NC (US); Bruce Moore, Graham, NC (US)

(73) Assignee: Honda Motor Co., Ltd., Tokyo (JP)

(*) Notice: Subject to any disclaimer, the term of this patent is extended or adjusted under 35 U.S.C. 154(b) by 295 days.

(21) Appl. No.: 10/687,990

(22) Filed: Oct. 17, 2003

(51) Int. Cl.
*B23P 19/00* (2006.01)
*B25F 1/00* (2006.01)

(52) U.S. Cl. ...................... 29/426.5; 29/270; 29/281.6; 29/267; 29/402.03; 29/426.1; 7/100; 7/151; 7/166; 7/168; 81/3.55; 81/3.56; 81/3.57

(58) Field of Classification Search ............ 29/402.03, 29/426.1, 426.5, 267, 270, 281.6, 426.05; 7/100, 151, 166, 168, 170; 81/3.07, 3.09, 81/3.15, 3.25, 3.27, 3.29, 3.31, 3.33, 3.36, 81/3.37, 3.4, 3.44, 3.55, 3.56, 3.57
See application file for complete search history.

(56) References Cited

U.S. PATENT DOCUMENTS

| | | | | | |
|---|---|---|---|---|---|
| 111,351 | A | * | 1/1871 | Kirby | 81/3.37 |
| 961,224 | A | | 6/1910 | Fischer | |
| 1,040,564 | A | * | 10/1912 | Merrill | 81/3.35 |
| 1,492,908 | A | * | 5/1924 | Trumbo | 7/151 |
| 1,663,061 | A | * | 3/1928 | Rich | 254/121 |
| 1,728,418 | A | * | 9/1929 | Litchfield | 81/3.36 |
| 1,814,435 | A | * | 7/1931 | De Laney | 72/458 |
| 1,933,384 | A | * | 10/1933 | Moylan | 294/17 |
| 2,431,833 | A | * | 12/1947 | Simpson | 81/3.44 |
| 2,440,485 | A | * | 4/1948 | Ranseen | 81/3.56 |
| 2,590,150 | A | * | 3/1952 | Brugmann | 29/245 |
| 2,748,636 | A | * | 6/1956 | Busby | 81/487 |
| 2,757,561 | A | * | 8/1956 | Roy | 81/3.44 |
| 2,931,258 | A | * | 4/1960 | Ronning, Jr. | 81/3.44 |
| 2,995,340 | A | * | 8/1961 | Richardson | 254/256 |
| 3,274,675 | A | * | 9/1966 | Jackson | 29/267 |
| 3,908,438 | A | * | 9/1975 | Norden | 72/458 |
| D244,575 | S | * | 6/1977 | Endres et al. | D8/40 |
| 4,074,411 | A | * | 2/1978 | Willard et al. | 29/267 |
| 4,234,988 | A | * | 11/1980 | Ross et al. | 7/151 |
| 4,327,607 | A | * | 5/1982 | Morris | 81/3.36 |
| D276,304 | S | * | 11/1984 | DiFede | D8/40 |
| D276,585 | S | * | 12/1984 | DiFede | D8/40 |
| 4,492,132 | A | | 1/1985 | Obey | 81/3.1 R |
| 4,586,404 | A | * | 5/1986 | Ginther | 81/3.57 |
| 4,646,378 | A | * | 3/1987 | Borden | 7/140 |
| 4,747,173 | A | | 5/1988 | Marceau | 7/156 |
| 4,881,432 | A | | 11/1989 | Olorenshaw et al. | 81/3.36 |
| 5,069,090 | A | | 12/1991 | Clark | 81/3.09 |
| 5,070,564 | A | * | 12/1991 | Fey | 7/170 |
| 5,181,440 | A | * | 1/1993 | Jagt | 81/484 |

(Continued)

FOREIGN PATENT DOCUMENTS

| | | | |
|---|---|---|---|
| EP | 484285 A1 | * | 5/1992 |

(Continued)

*Primary Examiner*—Essama Omgba
(74) *Attorney, Agent, or Firm*—Standley Law Group LLP

(57) ABSTRACT

A device for facilitating the separation and removal of an engine cover from a sealing surface on an engine. The engine cover puller may reduce or eliminate the deformation of an engine cover during its removal and allows for its potential reuse. In addition, the engine cover puller may reduce or eliminate the damage to the sealing surfaces between the engine cover and the engine that may occur during an engine cover removal.

13 Claims, 5 Drawing Sheets

U.S. PATENT DOCUMENTS

| | | | | | |
|---|---|---|---|---|---|
| 5,222,265 | A | * | 6/1993 | Hermansson | 7/156 |
| 5,241,719 | A | | 9/1993 | Memmelaar | 7/156 |
| 5,247,715 | A | * | 9/1993 | Nishiguchi | 7/138 |
| 5,295,419 | A | | 3/1994 | Denning | 81/3.37 |
| 5,476,023 | A | * | 12/1995 | Calandro | 81/3.57 |
| 5,778,472 | A | | 7/1998 | Lang | 7/156 |
| 5,931,059 | A | * | 8/1999 | Hammer | 81/3.57 |
| 6,041,460 | A | | 3/2000 | Cholewinski | 7/156 |
| 6,199,452 | B1 | * | 3/2001 | Vinar | 81/3.57 |
| 6,286,399 | B1 | * | 9/2001 | Ferster | 81/121.1 |
| 6,578,223 | B1 | | 6/2003 | Link et al. | 7/156 |
| 6,736,183 | B1 | * | 5/2004 | Magnani | 157/1.3 |
| 6,854,361 | B1 | * | 2/2005 | Vandergaw | 81/3.4 |
| 6,865,761 | B1 | * | 3/2005 | Henke et al. | 7/151 |
| 6,976,297 | B1 | * | 12/2005 | Liu | 29/270 |

FOREIGN PATENT DOCUMENTS

| | | | | |
|---|---|---|---|---|
| GB | 2161796 | A | * | 1/1986 |
| WO | WO 93/17953 | | * | 9/1993 |

* cited by examiner

ENGINE COVER PULLER

BACKGROUND AND SUMMARY OF THE INVENTION

The present invention relates to a device for facilitating the separation and removal of an engine cover from a sealing surface on an engine. The present invention may reduce or eliminate the deformation of an engine cover during its removal and allows for its potential reuse. In addition, the present invention may reduce or eliminate the damage to the sealing surfaces between the engine cover and the engine that may occur during an engine cover removal.

A typical engine cover removal, such as the removal of a valve cover from a cylinder body, usually requires breaking a seal between the cover and the engine. This task, absent the use of the present invention, typically involves the mechanic inserting an item, such as a flat blade screwdriver, between the cover and the engine. Once the screwdriver is inserted, the mechanic pries the cover from the sealing surface on the engine. This can result in damage to the sealing surfaces between the cover and the engine. Occasionally, the damage is minimal such that a seal between the cover and engine can be reestablished upon assembly of the parts into a surface-to-surface contact of the sealing surfaces. On other occasions, a gasket or sealant is required to obtain a seal between the cover and the engine. On yet other occasions, one or both of the sealing surfaces must be restored by machining/surfacing operations. And, on other occasions, the damage to the sealing surfaces during the removal of the cover results in the required replacement of one or more parts in order to obtain a seal between a cover and an engine.

A vast number of covers used on engines are comprised of stamped material or composites such as metals and plastics. While such materials are adequate for their installed function as a cover, the covers may be susceptible to damage during removal operations such as described previously. In addition to sealing surface damage as described above, typical damage to the covers may include permanent deformation and cracking. As a result, a mechanic may have to spend excessive time attempting remedial measures that do not always result in successful solutions such as reshaping the deformed cover or using an excessive amount of sealant that may be susceptible to damage or subjected to undesirable environmental conditions. On many occasions, the only viable solution for a mechanic may be to replace the damaged cover with a new cover or a used cover in suitable condition. However, sometimes a replacement cover is not obtainable within the time constraints of the job. For example, the device using the engine, such as an automobile, may not be movable until the cover has been replaced. In the meantime, the automobile might occupy a mechanic's work area or a vehicle lift. On other occasions, the cover may have been removed to perform emergency repairs in a remote location. As a result, despite the repair having been completed, the engine may be inoperable until a replacement cover is obtained and installed.

The device of the present invention facilitates the separation and removal of an engine cover from a sealing surface on an engine. The present invention is an apparatus to allow an operator to provide a separation force via the movement of a lever arm to move a puller arm engaging an engine cover that will be sufficient to separate the engine cover from a sealing surface on an engine. The mechanical advantage provided by the present invention may be configured by modification of the length of the lever arm and/or the position of the mounting locations for either or both of the base and puller arm elements of the present invention. The present invention may be used to minimize or eliminate the bending of the cover during its removal from the engine. The present invention may provide a complementary surface for engaging an engine cover that adequately distributes the force applied as might be required to break the seal between the cover and the engine. The present invention may prevent or eliminate the potential for damage to the sealing surfaces between an engine cover and an engine.

The present invention comprises a device having a base used to contact a portion of an engine cover to be removed from an engine. The base may be shaped to provide a complementary fit with the engine cover. The fit between the base and the engine cover may also allow the distribution of a stabilizing force that is generated as a result of the movement of the lever arm of the present invention.

The present invention also includes a lever arm that is typically pivotably connected to the base. The base is typically connected on one end of the lever arm. The lever arm is preferably moved by a user to cause a typically pivotably connected puller arm to move while the puller arm is engaged to an engine cover. The movement of the puller arm then causes the engine cover to separate from the sealing surface on an engine.

Embodiments of the present invention may include channels or shaped elements on the puller arm in order to provide complementary engagement of the puller arm to the engine cover. As a result, the desirable distribution of a separating force to separate the cover from the sealing surface on the engine may prevent, minimize, or eliminate the deformation of the cover as it is separated from the engine.

An example use of the device of the present invention would involve the positioning of the puller arm so that it adequately engages at least a portion of the engine cover. Typically the puller arm would engage the lower surface or an underside of the cover. Then, the base of the present invention would be positioned on another portion of the cover. Typically this portion would be on an upper surface of the cover. As stated earlier, the base may be complementary shaped so as to allow for the distribution of a stabilizing force that is generated when the lever arm is moved. After engagement of the cover by the puller arm and placement of the base on the cover, the lever arm is moved to separate the cover from the engine. A separating force may have to overcome a seal between the cover and the engine. The separating force applied by the device of the present invention can be affected by either the length of the lever arm or the locations of attachment for the typically pivotably attached puller arm and base. Sometimes, the application of the separating force can be a factor in facilitating the breaking of a seal between the cover and the engine. For example, a sharp or quick application of force may be applied via use of the device of the present invention in order to break the seal between the cover and the engine.

Examples of typical engine covers that may be removed with the use of the present invention include, but are not limited to, a valve cover, a case cover, a dust cover, and an engine pan.

BRIEF DESCRIPTION OF THE DRAWINGS

In addition to the novel features and advantages mentioned above, other objects and advantages of the present invention will be readily apparent from the following descriptions of the drawings and preferred embodiments.

DETAILED DESCRIPTION OF THE EXEMPLARY EMBODIMENT(S)

Figure 1:
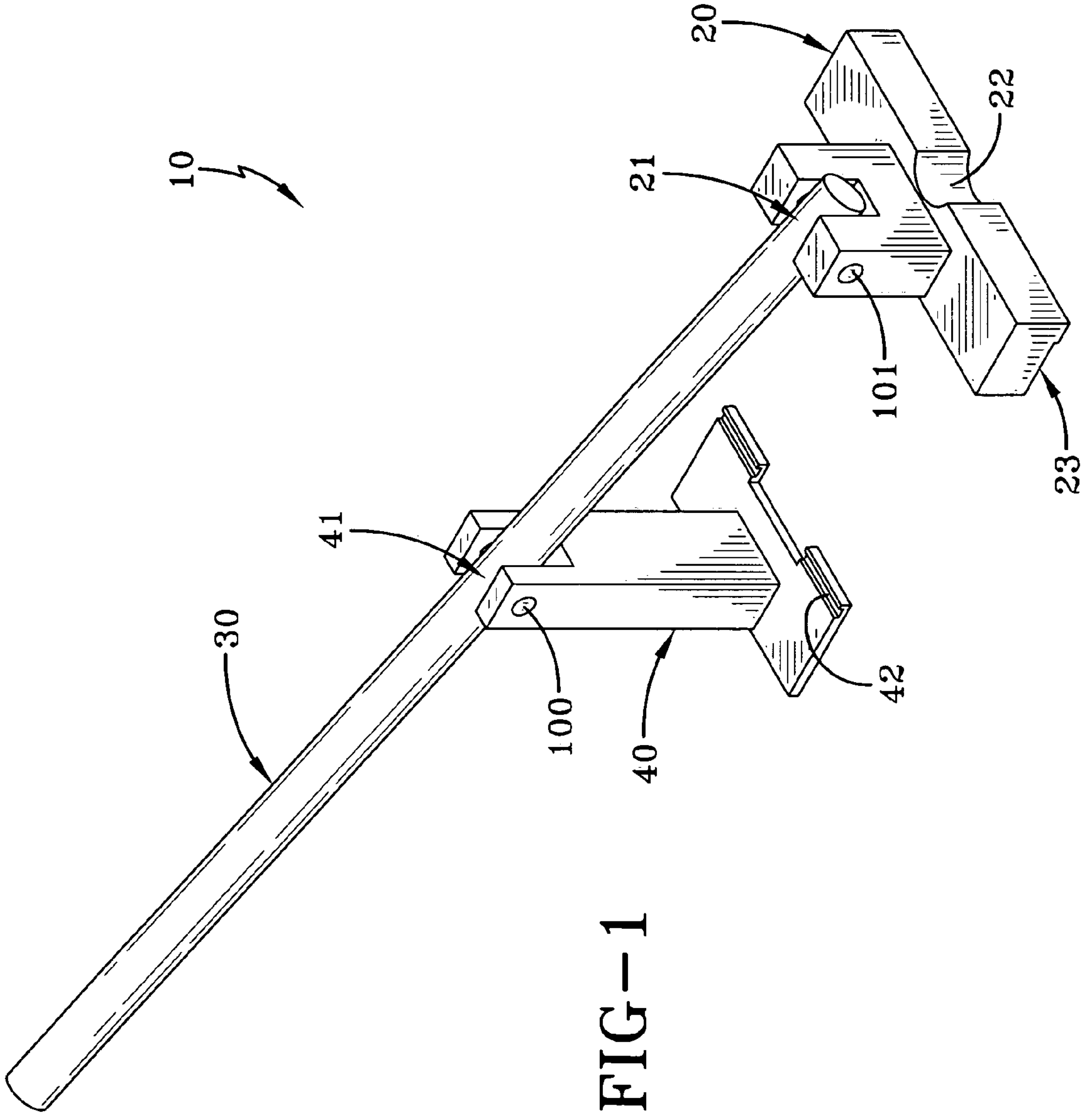
FIG. 1 is a perspective view of an embodiment of the apparatus of the present invention.
Figure 2:
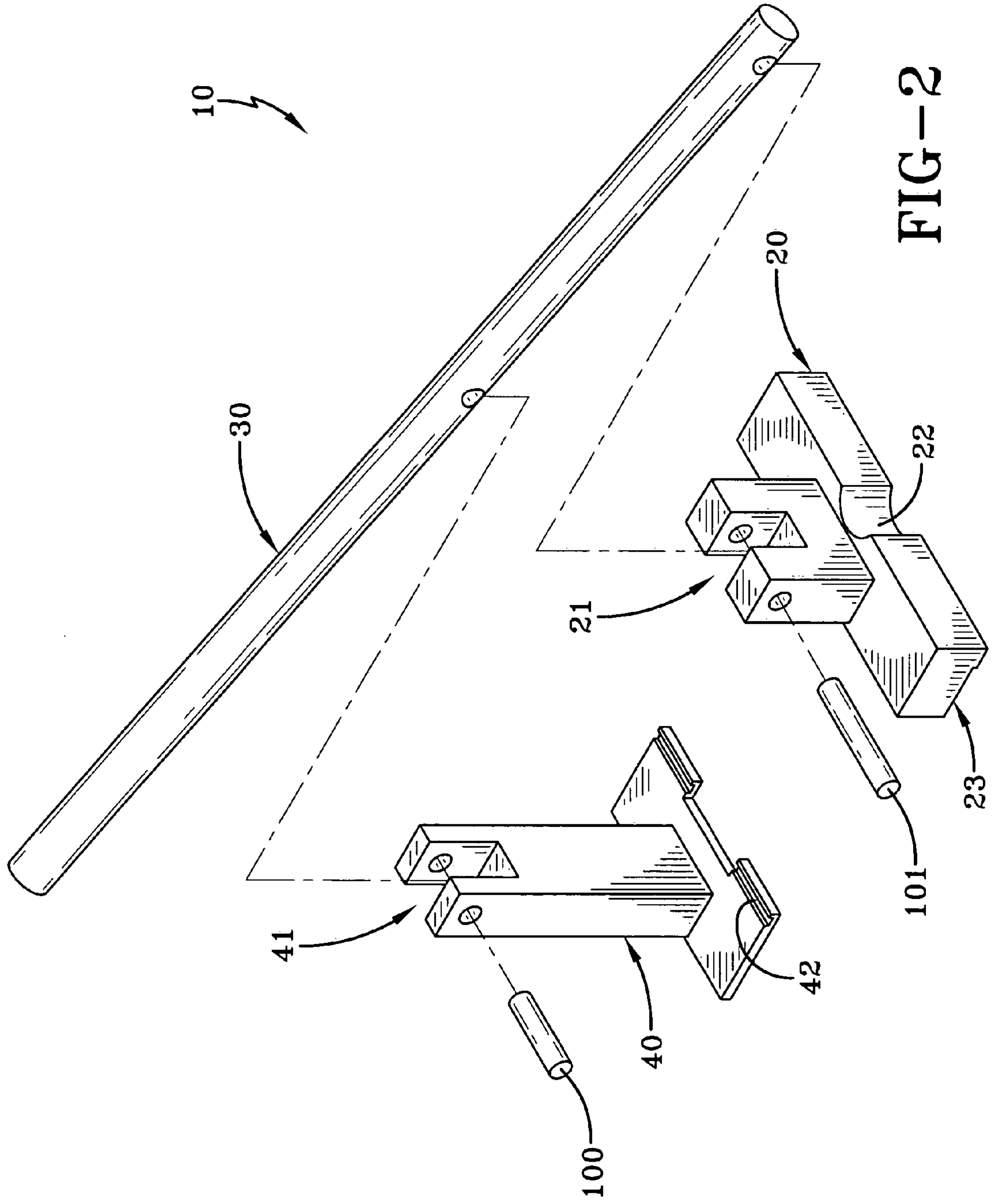
FIG. 2 is a perspective view of an embodiment of the apparatus of the present invention.

One embodiment of the engine cover puller of the present invention can be seen by reference to FIGS. 1 and 2. As can be observed, the engine cover puller 10 is comprised of a base 20, a lever arm 30, and a puller arm 40. The base 20 and puller arm 40 are shown pivotably connected to the lever arm 30 at 21 and 41, respectively. A pivot pin 100 is shown at the pivotable connection 41 between the puller arm 40 and the lever arm 30. Also shown is a pivot pin 101 at the pivotable connection 21 between the base 20 and the lever arm 30. In this manner, the pivotable connections at 21 and 41 allow for placement of the base 20 and the engagement of the puller arm 40 to achieve and maintain an alignment with a cover to be removed during a substantial portion of movement of the lever arm 30 to effect the separation of an engine cover from a sealing surface with an engine. In other words, the lever arm 30 is pivotably mounted to the base 20 at 21 so that the lever arm 30 may pivot about a first axis. Concurrently, the lever arm 30 is pivotably mounted to the puller arm 40 at 41 so that the lever arm 30 pivots about a second axis that is spaced from the first axis.

Also shown on FIGS. 1 and 2 is a channel 42 on the puller arm 40. The channel 42 in the example embodiment is shaped so as to provide a complementary fit with the lip on the lower surface of an engine cover. The channel may be a single channel or it may be multiple channels. It is not required that the channels be in any particular alignment. Instead, it is preferred that the shape, location, and number of channels on the puller arm 40 should be dictated by the arrangement that is advantageous to the particular application to provide a suitable contact surface with the engine cover to be removed so that the potential for damage to the cover or the sealing surface is minimized or controlled. This feature of the present invention is not limited to channels. For example, preferred embodiments of the present invention may use cutouts or unique profiles so as to make a complementary engagement with an engine cover to be removed. In addition, the puller arm may have holes or studs to accommodate a simple attachment to an engine cover to be removed with a version of the present invention.

Also shown on the perspective view of the base 20 at FIGS. 1 and 2 is an example groove 22 of the base 20 to accommodate the intended cover for this embodiment. For example, the groove 22 may remove a portion of the base 20 from around the periphery of a projection from an engine cover or the engine, such as a spark plug. Another feature of the example embodiment of the present invention includes an exemplary shaped bottom surface 23 of the base 20 as shown in FIGS. 1 and 2. The shaped bottom surface 23 provides a complementary fit with a cover intended to be used with this particular embodiment of the present invention.

Figure 3:
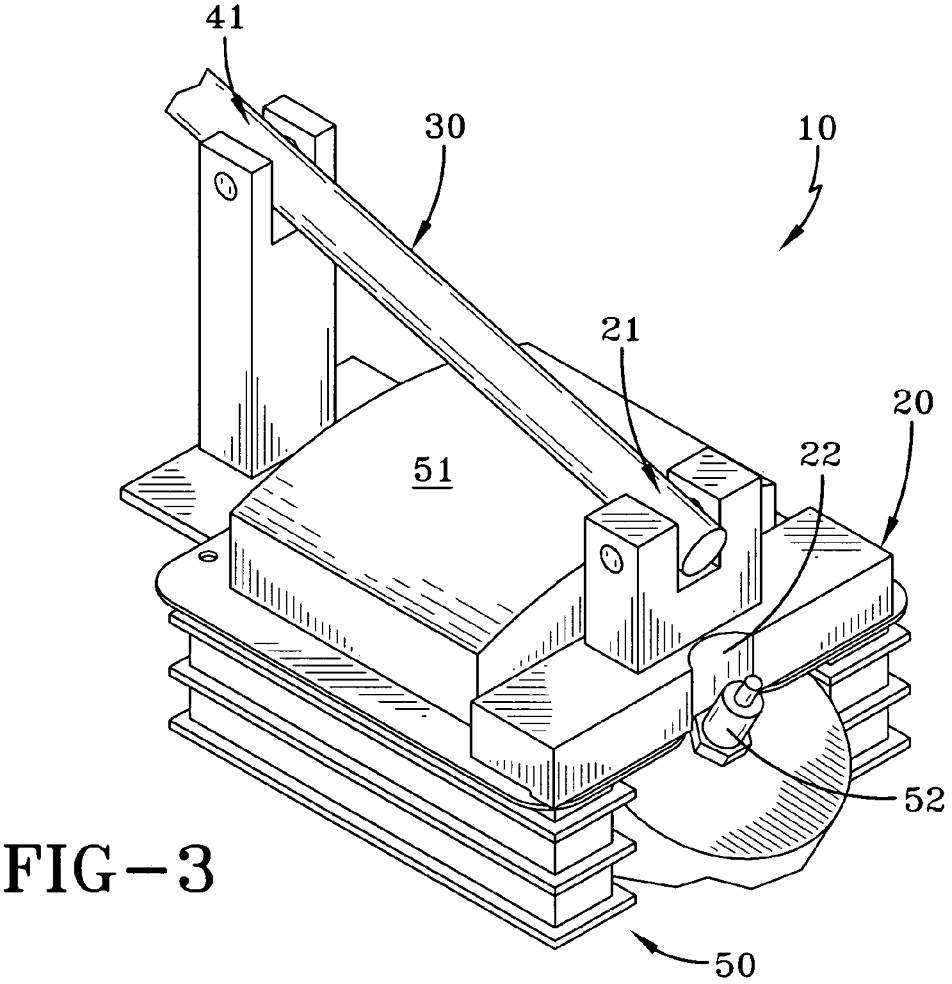
FIG. 3 is a view showing a portion of an embodiment of the apparatus in operation.

Portions of an embodiment of the engine cover puller of the present invention in operation can be seen by reference to FIGS. 3, 4, 5, and 6. As can be observed in FIG. 3, the base 20 of an engine cover puller 10 is shown in contact with the upper surface of a valve cover 51 of an engine 50. FIG. 3 also shows a spark plug at 52. As can be observed, the base 20 has a groove 22 that allows for the base 20 to be placed in a complementary fit with a portion of the surface of the valve cover 51 by surrounding a portion of the periphery around the spark plug 52. FIG. 3 also shows the pivotable connections 21 and 41 between the lever arm 30 and the base 20 and the puller arm 40, respectively.

Figure 4:
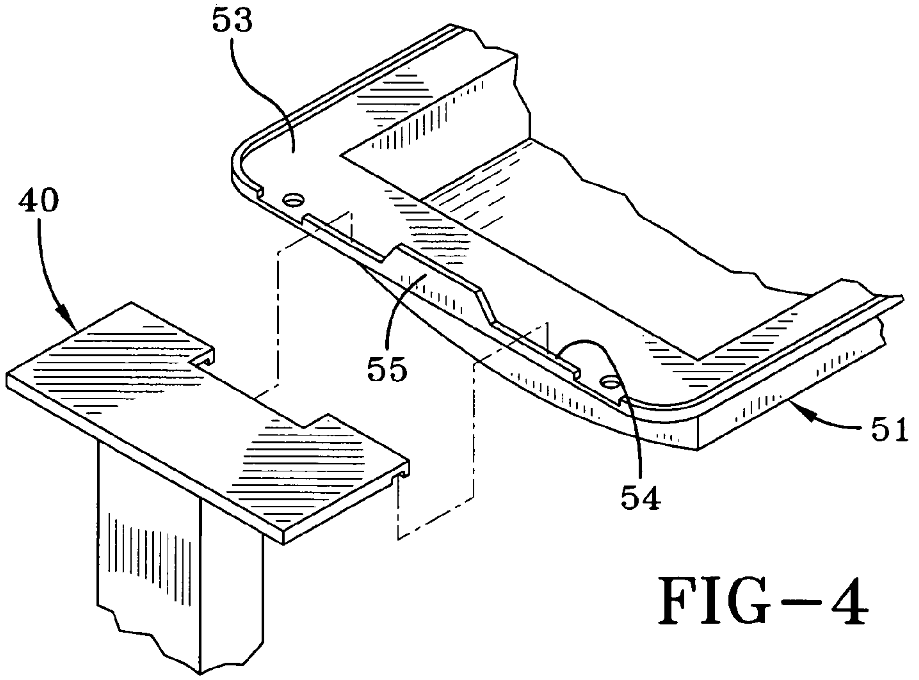
FIG. 4 is a view showing a portion of an embodiment of the apparatus in operation.

As can be observed in FIG. 4, a portion of the lower surface 53 of the valve cover 51 and, in particular, the lip at 54 is shown in engagement with a portion of the pulling arm 40. As can be seen in FIG. 4, the versatility of shapes for the pulling arm 40 allows for a portion of the pulling arm 40 to be cut away to allow for the additional overhanging portion 55 of the lip 54 of the lower surface 53 of the valve cover 51 to remain undamaged during the removal operation of the cover 51.

Figure 5:
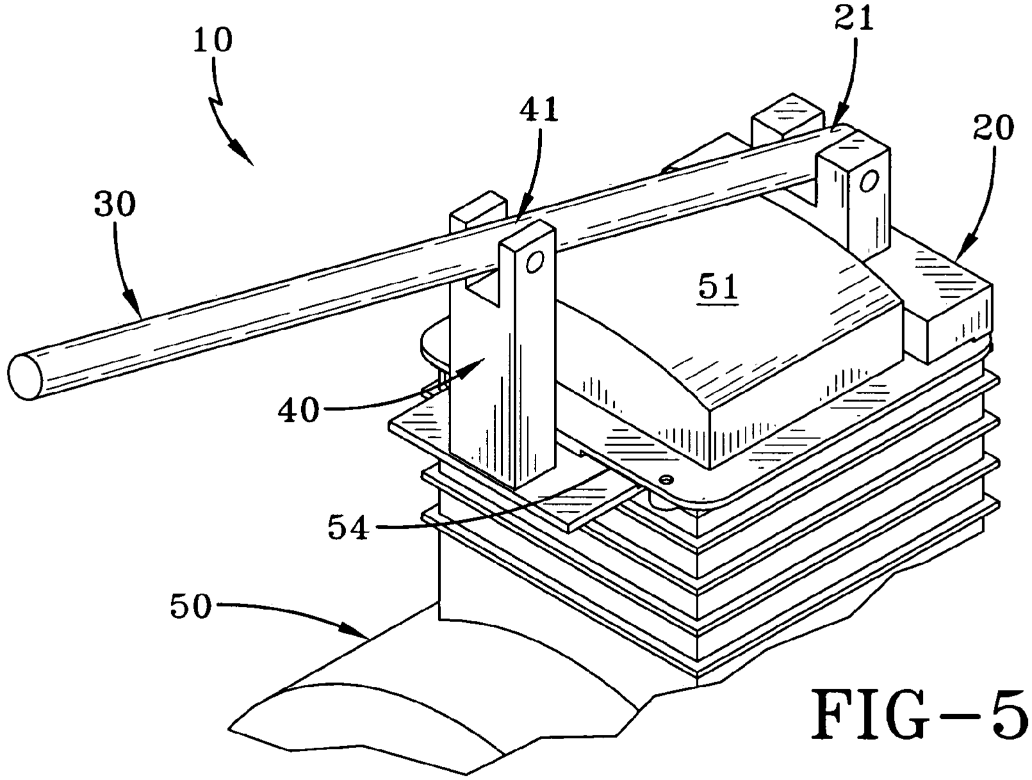
FIG. 5 is a view showing a portion of an embodiment of the apparatus in operation.
Figure 6:
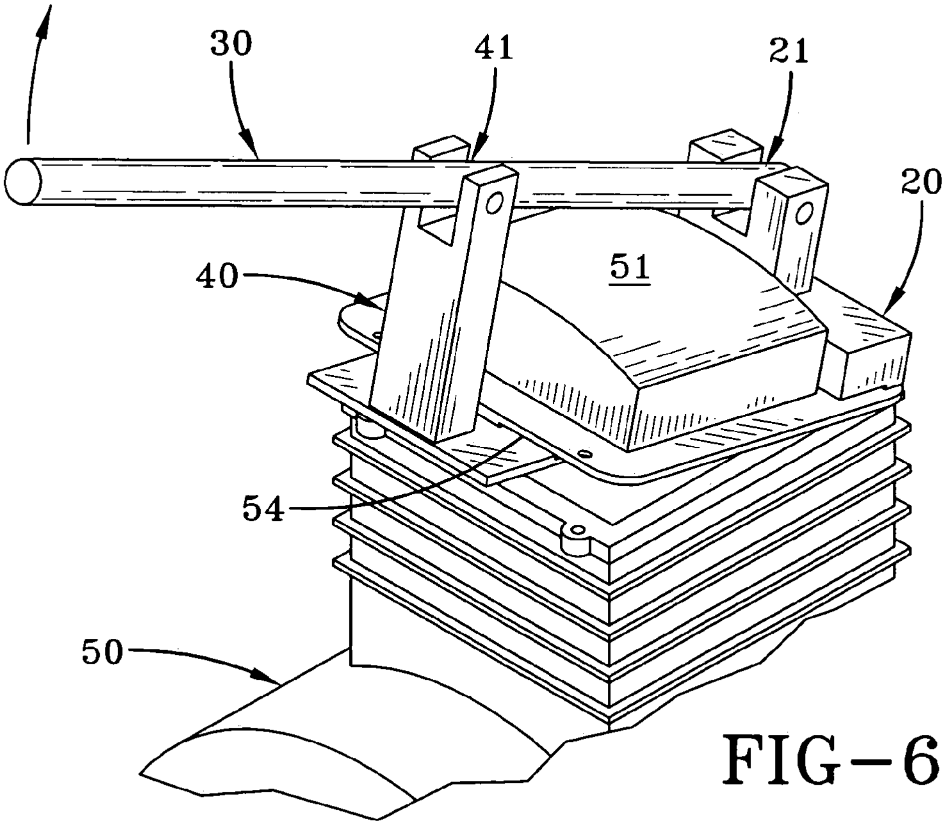
FIG. 6 is a view showing a portion of an embodiment of the apparatus in operation.

As can be observed in FIGS. 5 and 6, the engine cover puller 10 is shown with the base 20 in contact with the upper surface of the valve cover 51 and the puller arm 40 engaged to the lip 54 of the valve cover 51. As is evident from FIGS. 5 and 6, the engine cover puller 10 is used to separate the valve cover 51 from the engine 50 when the lever arm 30 is moved to generate a sufficient separation force to pull the cover 51 from the sealing surface of the engine 50. FIG. 5 shows the engine cover puller 10 in contact and engaged to the valve cover 51 just prior to the movement of the lever arm 30. FIG. 6 shows the resultant separation of at least a portion of the cover 51 from a sealing surface of the engine 50. As may be observed in FIG. 6, the cover 51 has been lifted relative to the engine 50. In addition, it should be appreciated that the pivotable connections 21 and 41 allow the base 20 and puller arm 40 to remain in alignment with their respective contact and engagement surfaces with the cover 51 as the lever arm 30 and the puller arm 40 pivot about separately spaced first and second axes, respectively.

Figure 7:
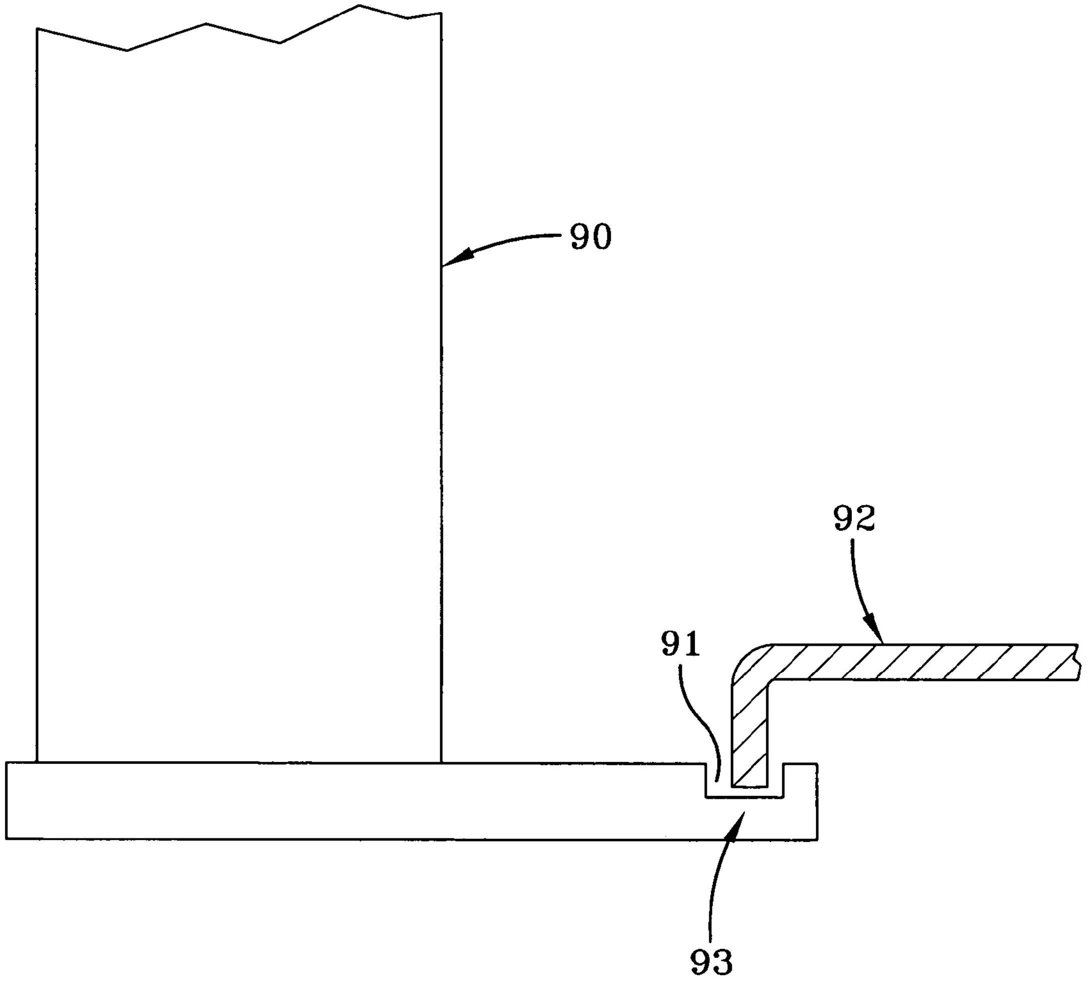
FIG. 7 is a side elevational view showing a portion of an embodiment of the apparatus in operation.

FIG. 7 is a detailed illustration of an exemplary embodiment of a portion of the present invention in operation. FIG. 7 shows a channel 91 of a portion of a puller arm 90 engaged to a portion of an engine cover 92. As shown at 93, the channel 91 provides a complementary fit to the portion of the engine cover 92. Preferred embodiments of the present invention do not require the fit between a cover and a channel, or another portion of the puller arm, to be held to close tolerances. Instead, it is preferred, for some embodiments of the present invention, that an engagement between a puller arm and an engine cover need only be adequate to allow the use of the apparatus of the present invention to transfer a force sufficient to separate a cover from the remainder of an engine. Alternatively, other embodiments of the present invention may have a close tolerance engagement or fit between the puller arm and a cover. Such close tolerance engagements may be desired for embodiments tailored for specific cover removal applications.

Preferred embodiments of the present invention may operate as a second class lever. The system of the second class lever is characterized by a fulcrum located in the vicinity of a first end of a lever and a force located in the vicinity of a second end of the lever. The load of the second class lever is located between the fulcrum and the force. Another typical characteristic of a second class lever is that the load is moved in the same direction as the applied force. As shown in preferred embodiments of the present invention, the base in contact with an engine cover to be removed would be considered the vicinity of the fulcrum of a lever. The end of the lever arm opposite its pivotable attachment to the base would be the general vicinity of the application of a force, such as would be applied by a user of an embodiment of the present invention. Between the application of the force on an end of the lever arm and the pivotable connection with the base in contact with a cover on the opposite end of the lever, the puller arm is engaged to the cover to be removed. As a force is applied to the lever arm, a separating force is generated as the puller arm engages the cover and displaces the "load" by removing the cover from at least a portion of a sealing surface between the cover and the engine.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A method for separating an engine cover from a sealing surface with the remainder of an engine, said method comprising the steps of:
- positioning a base to contact at least a first portion of said engine cover;
- positioning a puller arm to engage at least a second portion of said engine cover;
- moving a lever arm pivotably attached to said base and to said puller arm; and
- generating a separating force by said movement of said lever arm sufficient to remove said engine cover from at least a portion of said sealing surface on said remainder of an engine,
- wherein said lever arm pivots about a first axis relative to said base;
- wherein said puller arm pivots about a second axis relative to said lever arm; and
- wherein said first axis is spaced from said second axis.

2. An engine cover puller apparatus, said apparatus comprising:
- a base to contact at least a first portion of an engine cover;
- a lever arm having a first end and a second end, said first end of said lever arm pivotably connected to said base;
- a puller arm adapted to engage said engine cover, said puller arm pivotably connected to said lever arm between said first end and said second end of said lever arm; and
- at least one channel on said puller arm, said at least one channel providing a complementary fit to engage at least a second portion of said engine cover;
- wherein when an upward separation force is applied to said second end of said lever arm while said puller arm engages said second portion of said engine cover, said engine cover separates from said sealing surface of said engine.

3. The apparatus of claim 2, wherein said base is shaped to provide a complementary fit to said at least a first portion of said engine cover.

4. The apparatus of claim 2, wherein said apparatus is a second class lever providing a separating force upon said sufficient movement of said second end of said lever arm;
- wherein said base contacts said at least a first portion of said engine cover; and
- wherein said at least one channel engages said at least a second portion of said engine cover.

5. A device for separating a part of an engine from a sealing surface with the remainder of said engine, said device comprising:
- a base to contact at least a first portion of said part of an engine;
- a lever arm having a first end and a second end, said first end of said lever arm pivotably connected to said base;
- a puller arm adapted to engage said part of an engine, said puller arm pivotably connected to said lever arm between said first and said second ends of said lever arm; and
- at least one channel on said puller arm, said at least one channel providing a complementary fit to engage at least a second portion of said part of an engine;
- wherein when an upward separation force is applied to said second end of said lever arm while said puller arm engages said second portion of said part of an engine, said part of en engine separates from said sealing surface with said remainder of an engine.

6. The device of claim 5, wherein said base is shaped to provide a complementary fit to said at least a first portion of said part of an engine.

7. The device of claim 5,
- wherein a stabilizing force is generated during said sufficient movement of said lever arm; and
- wherein said base distributes said stabilizing force upon said at least a first portion of said part of an engine.

8. The device of claim 5, wherein said apparatus is a second class lever providing a separating force upon said sufficient movement of said second end of said lever arm;
- wherein said base contacts said at least a first portion of said part of an engine; and
- wherein said at least one channel engages said at least a second portion of said part of an engine.

9. The device of claim 5 wherein said part of an engine is selected from the group consisting of a valve cover, an engine cover, a case cover, a dust cover, and an engine pan.

10. The device of claim 5 wherein said remainder of said engine is selected from the group consisting of an engine block, a portion of an engine block, and a cylinder.

11. A device for separating a part of an engine from a sealing surface with the remainder of said engine, said device comprising;
- a base to contact at least a first portion of said part of an engine at an upper surface;
- a lever arm pivotably mounted to said base to pivot about a first axis;
- a puller arm adapted to engage a second portion of said part of an engine along an underside thereof and to apply a pulling force thereto, said puller arm pivotably mounted to said lever arm for pivoting about a second axis spaced from said first axis; and
- at least one channel on said puller arm, said at least one channel providing a complementary fit to engage said part of an engine at a lower surface of a second portion;
- whereby pivoting of said lever arm about said first axis by applying an upward separating force to said second end of said lever arm lifts said puller arm upward with respect to said lower surface of said second portion of said part of an engine and applies a pulling force thereto, thereby separating said part of an engine from said sealing surface with the remainder of said engine.

12. The device of claim 11, wherein said base is shaped to provide a complementary fit to said at least a first portion of said part of an engine.

13. The device of claim 11, wherein said part of an engine is selected from the group consisting of a valve cover, an engine cover, a case cover, a dust cover, and an engine pan.

* * * * *